US012768231B2

(12) United States Patent
Riseth

(10) Patent No.: US 12,768,231 B2
(45) Date of Patent: Oct. 20, 2026

(54) EXTENSIBLE TUBING AND A METHOD OF FACILITATING TRANSFER OF FLUID

(71) Applicant: SMARTHOSE AS, Tysse (NO)

(72) Inventor: Roar Førland Riseth, Stavanger (NO)

(73) Assignee: Smarthose AS, Tysse (NO)

( * ) Notice: Subject to any disclaimer, the term of this patent is extended or adjusted under 35 U.S.C. 154(b) by 440 days.

(21) Appl. No.: 18/577,376

(22) PCT Filed: Jul. 5, 2022

(86) PCT No.: PCT/NO2022/050164
§ 371 (c)(1),
(2) Date: Jan. 8, 2024

(87) PCT Pub. No.: WO2023/282765
PCT Pub. Date: Jan. 12, 2023

(65) Prior Publication Data
US 2026/0251026 A1 Aug. 27, 2026

(30) Foreign Application Priority Data
Jul. 9, 2021 (NO) .................................... 20210890

(51) Int. Cl.
*E21B 21/01* (2006.01)
*F16L 27/12* (2006.01)

(52) U.S. Cl.
CPC ............ *E21B 21/019* (2020.05); *F16L 27/12* (2013.01)

(58) Field of Classification Search
CPC ............................... E21B 21/019; F16L 27/12
See application file for complete search history.

(56) References Cited

U.S. PATENT DOCUMENTS

| | | | |
|---|---|---|---|
| 4,545,702 | A | 10/1985 | Sano |
| 6,460,620 | B1 | 10/2002 | Lafleur |
| 2010/0051290 | A1 | 3/2010 | Williford |

FOREIGN PATENT DOCUMENTS

| | | | |
|---|---|---|---|
| CN | 102839941 | A | 12/2012 |
| EP | 1256691 | A2 | 11/2002 |

(Continued)

OTHER PUBLICATIONS

PCT/NO2022/050164, International Search Report and Written Opinion dated Sep. 29, 2022, 6 pages.

(Continued)

*Primary Examiner* — James G Sayre
(74) *Attorney, Agent, or Firm* — Andrus Intellectual Property Law, LLP

(57) ABSTRACT

An extensible tubing and a method are for facilitating transfer of fluid between a fluid supplying device and a fluid receiving device. The extensible tubing is configured for connection to the fluid supplying device and for receiving a fluid therefrom. The extensible tubing has a housing with a first end portion and a second end portion A core is arranged inside the housing and secured thereto. A pipe is arranged between the housing and the core. The pipe is axially movable between a retracted position wherein a seal prevents fluid from passing between the core and the pipe, and an extended position wherein the seal does not prevent fluid from passing between the core and the pipe. A piston and a biasing means are for urging the pipe towards its retracted position.

20 Claims, 8 Drawing Sheets

(56) References Cited

FOREIGN PATENT DOCUMENTS

| | | | | | |
|---|---|---|---|---|---|
| NO | 20170235 | A1 | | 8/2018 | |
| NO | 345136 | B1 | | 10/2020 | |
| WO | WO-2020036491 | A1 | * | 2/2020 | ........... E21B 21/106 |

OTHER PUBLICATIONS

Norwegian Application No. 20210890, Norwegian Search Report, Jan. 7, 2022, 2 pages.

* cited by examiner

SECTION B-B

EXTENSIBLE TUBING AND A METHOD OF FACILITATING TRANSFER OF FLUID

CROSS-REFERENCE TO RELATED APPLICATIONS

This application is the U.S. national stage application of International Application No. PCT/NO 2022/050164, filed Jul. 5, 2022, which international application was published on Jan. 12, 2023 as WO 2023/282765 in the English language. The International Application claims priority to Norwegian Patent Application No. 20210890, filed Jul. 9, 2021. The international application and Norwegian application are both incorporated herein by reference, in their entirety.

FIELD

The present disclosure is related to a tubing. More specifically, the disclosure is related to an extensible tubing for facilitating transfer of fluid between a fluid supplying device and a fluid receiving device, the extensible tubing comprising a first tubing portion for connection to the fluid supplying device and for receiving a fluid therefrom, and a second tubing portion for communicating the fluid to the fluid receiving device.

BACKGROUND

The extensible tubing disclosed herein is developed primarily in response to a need in the petroleum industry. More particularly, the tubing is developed for facilitating fluid transfer between a top drive of a drilling rig and a casing, liner, or drillpipe during a casing-, liner-, or drillpipe running operation. In a casing running operation, a lowermost casing joint of a casing string has been sealed off. A purpose of supplying a fluid during a casing running operation is to fill a casing with a balancing fluid, as will be appreciated by a person skilled in the art.

A conventional method of filling a casing is to run several casing joints, typically six to eight, into the well and then stop the running operation to fill a balancing fluid into the casing string. The filling may be performed by lowering the top drive onto the top portion of the casing string, or by means of a hose from a drilling floor. This conventional method is undesired for numbers of reasons. Firstly, the method requires the running operation to be interrupted. An interruption of the running operation represents a risk of the casing string getting stuck in the bore hole. Secondly, the conventional method is relatively time consuming and thus expensive. Filling a casing string by means of a hose on a deck of an installation requires personnel to enter the so-called red zone of the drilling rig. Personnel working in the red zone of a drilling rig is subject to a substantial risk of serious incidents related to remotely operated equipment and dropped objects.

Publication CN102839941 A1 discloses an extensible tubing that is extended in two steps. The extensible tubing comprises a first compression spring and a second compression spring. The first compression spring is associated with an outer telescopic section assembled from an upper telescopic tube and a lower telescopic tube. The second compression spring is associated with an inner telescopic section comprised of a sealing tube slidably arranged within the lower telescopic tube of the outer telescopic section. The first compression spring serves to bias the outer telescopic section towards its retracted position, whereas the second compression spring serves to bias the inner telescopic sealing tube towards its retracted position. The extensible tubing operates as an on/off valve and requires a fluid supply pressure to be bled of upstream of the valve to allow closing of the valve.

Publication NO 345136 B1 discloses a method and a device for supplying liquid to a liner, which solves at least some of the drawbacks of prior art.

The device disclosed in NO 345136 B1 comprises a filling pipe for delivery of liquid through an outlet nozzle to a casing in a well connected to an installation, where a pipe end being part of the filling pipe is telescopically extendable and can be pushed outwards during liquid supply, and then be withdrawn. The pipe end part comprises a constricted liquid outlet which, when subject to flowing liquid, sets up an overpressure in the liquid in the filling pipe in order to generate said extension. The pipe end part and the filling pipe are mutually connected with a body that is prestressed during the extension of the pipe end part, and which can pull back the pipe end part.

SUMMARY

The object of the invention is to remedy or to reduce at least one of the drawbacks of the prior art, or at least to provide a useful alternative to prior art.

The object is achieved through features specified in the description below and in the claims that follow.

The present invention relates to an extensible tubing and a method of facilitating transfer of fluid between a fluid supplying device and a fluid receiving device, and substantially without experiencing any spill of fluid.

The invention is defined by the independent patent claims. The dependent claims define advantageous embodiments of the invention.

In a first aspect of the invention, an extensible tubing for facilitating transfer of fluid between a fluid supplying device and a fluid receiving device is provided, the extensible tubing comprising a first tubing portion for connection to the fluid supplying device and for receiving a fluid therefrom, and a second tubing portion for communicating the fluid to the fluid receiving device. The second tubing portion comprises:

- a housing having a first end portion and a second end portion;
- a core arranged inside the housing and secured thereto;
- a pipe arranged between the housing and the core, the pipe being axially movable between a retracted position wherein a seal prevents fluid from passing between the core and the pipe, and an extended position wherein the seal does not prevent fluid from passing between the core and the pipe;
- a piston forming part of the pipe; and
- a biasing means configured for urging the pipe towards its retracted position; wherein the pipe is movable towards its extended position upon exposure to a fluid pressure force exceeding an opposite force from the biasing means;
- wherein the piston is formed by a transition zone from a larger first pipe portion having a first flow area defined between the first pipe portion and the core, and a smaller second pipe portion having a second flow area defined between the second pipe portion and the core, the second flow area being smaller than the first flow area; and wherein the seal is configured for sealing between the smaller second pipe portion and the core when the pipe is closer to its retracted position than to its extended position.

Thus, when a force from a fluid pressure acting on the piston is less than a force from the biasing means, fluid is prevented from passing through the extensible tubing, and when a force from a fluid pressure acting on the piston is larger than a force from the biasing means, the second tubing portion is urged towards its extended position wherein fluid passes through the extensible tubing, whereby fluid is communicated between the fluid supplying device and the fluid receiving device.

The core may be arranged coaxially inside the housing. One effect of this is that the extensible tubing becomes relatively simple to manufacture.

In one embodiment, the first tubing portion forms part of the housing of the second tubing portion. In such an embodiment, the extension of the extensible tubing is provided by means of the axially movable pipe only.

In what follows, the extensible tubing will also be denoted tubing.

As disclosed above, the piston is formed by means of the transition zone between the larger first bore piping portion having the first flow area, and the smaller second bore piping portion having a second flow area being smaller than the first flow area. The terms large bore and small bore do not define any specific dimensions, but a mutual relation-ship between the flow areas on either side of the transition zone. Thus, for a piping having a circular cross-sectional flow area defined by an inner wall of the piping, the large bore piping portion is a first piping portion having a first internal diameter, and the small-bore piping portion is a second piping portion having a second internal diameter being smaller than the first internal diameter. The flow areas are defined by any space between an external surface of the core and an internal surface of the piping portions. Therefore, the piston comprises a transition zone from a larger first pipe portion having a first flow area, and a smaller second pipe portion having a second flow area being smaller than the first flow area.

In a preferred embodiment, a cross sectional area defined by an external surface of the core is smaller than a cross sectional area defined by an internal surface of the smaller second pipe portion, thereby providing a radial gap for allowing fluid flow between the core and the smaller second pipe portion. This has the effect of defining a space or gap between the smaller second pipe portion and the core, wherein the gap depends on an axial position of the second tubing portion with respect to the core. Thereby, fluid can flow through the tubing until the seal prevents fluid from passing between the core and the pipe. Thus, at least some of the fluid within the tubing is allowed to drain during retraction of the pipe. A retraction of the pipe occurs when the pressure force against the piston of the pipe is less than the force from the biasing means configured for urging the pipe towards its retracted position.

In a further embodiment, the smaller second pipe portion has a free end, and the seal is arranged within the smaller second pipe portion closer to its free end than to the piston. This advantageously facilitates drainage during retraction of the pipe. In one embodiment, the tubing is arranged so that the closer the seal is to the free end of the smaller second pipe portion, the more fluid is allowed to drain from the tubing before the seal prevents fluid communication out of the tubing.

Preferably, the core has a free end portion pointing away from the first tubing portion, and wherein the piston is positioned axially downstream of the free end portion of the core when the pipe is in its extended position, i.e., the piston is positioned on the pipe so as to extend beyond the free end portion of the core when the pipe is in its extended position. When in the extended position, this has the effect of the smaller second pipe portion being located axially downstream of the free end portion of the core. Thereby, a maximum flow through the tubing is achieved when the pipe is in its extended position.

As an alternative or addition to arranging the seal within the smaller second pipe portion and closer to its free end than to the piston, the seal may be arranged on a portion of the core at an axial position wherein the seal engages the smaller second pipe portion when the extensible tubing is closer to its fully retracted position than to its fully extended position. Thus, at least some of the fluid within the tubing is allowed to drain during retraction of the pipe. In one embodiment, the seal is arranged at an axial position of the core wherein the seal does not engage the smaller second pipe portion until the extensible tubing is fully retracted.

The axially movable pipe may be provided with a restrictor for providing a differential pressure in the fluid flowing into the axially movable pipe. Preferably, any such restrictor is arranged in the larger first pipe portion. One purpose of such a restrictor is to reduce a so-called "spray-effect" of the fluid passing the outlet of the axially moveable pipe. Another purpose of such a restrictor is to facilitate axial displacement of the axially movable pipe towards its extended position. A restrictor facilitating an axial displacement allows use of a heavy duty and more powerful biasing means. A heavy duty and more powerful biasing means may be advantageous with respect to returning the extensible tubing towards its retracted position.

In a preferred embodiment, the first tubing portion is a separate tubing portion connected to the second tubing portion, hence is separable from the second tubing portion. One advantage of providing a first tubing portion being separable from the second tubing portion is that the extensible tubing can be adapted to various types of fluid supplying devices simply by selecting a first tubing portion mating with the fluid supplying device. In the event of any damage to, for example, the inlet of the first tubing portion, another advantage of providing a first tubing portion being separable from the second tubing portion is that only the first tubing portion needs to be replaced, and not the second tubing portion. Still another advantage of providing a first tubing portion being separable from the second tubing portion will become apparent from the disclosure below, which relates to providing a valve in the first tubing portion.

In one embodiment, the first tubing portion is connected to the second tubing portion via a flexible pipe. One effect of connecting a separate, first tubing portion to the second tubing portion via a flexible pipe is that the flexible pipe may absorb any impacts that may arise during operation. A further effect is that the first tubing portion may, during operation, be non-coaxial with respect to the second tubing portion.

An important area of application of the present extensible tubing is to enable continuous filling of casing or liner when facilitating fluid transfer between a top drive of a drilling rig and a casing string during a casing running operation, which resembles the method and apparatus disclosed in NO 345136B1. Thus, the fluid supplying unit may comprise a so-called Saver Sub, while the fluid receiving device may be a top portion of a casing string subject to a running operation. Due to variable configurations of both the fluid supplying device and the fluid receiving device, a required length of extension of the tubing varies accordingly. It is therefore advantageous if the flexible pipe is axially extensible between a retracted position and an extended position. Preferably, such an extensible, flexible pipe comprises a biasing means configured for urging the flexible pipe towards a retracted position upon exposure to an opposite tension force between the first tubing portion and the second tubing portion being less than a biasing force of the biasing means. In one embodiment, the biasing means acting on the flexible pipe is separate from the flexible pipe. In an alternative embodiment, the biasing means acting on the flexible pipe is partly or fully integrated with the flexible pipe.

From the embodiments disclosed above, it should be clear that the extension of the tubing may be provided by means of the axially movable pipe of the second tubing portion, and by means of the extensible, flexible pipe arranged between the first tubing portion and the second tubing portion.

Fluid flow into the extensible tubing may be controlled by means of the fluid supplying device itself. However, although fluid flow may be controlled by means of the fluid supplying device itself, an inlet of the first tubing portion may still be subject to a hydrostatic column when there is no fluid flow. In some applications of the extensible tubing, for example when used for communicating fluid from a fluid supplying device on a rig to, for example, a casing or drill pipe, the fluid is supplied to the extensible tubing via a Kelly hose. In such an application, the hydrostatic column may be considerable, for example 40 meters.

In an advantageous embodiment, the extensible tubing comprises a valve for controlling fluid flow through the extensible tubing, the valve being arranged upstream of the piston of the axially movable pipe of the second tubing portion. In one related embodiment, the valve is arranged in the first tubing portion. Thus, the valve allows control of the fluid being in communication with the piston, hence controls the fluid passing through the extensible tubing. Preferably, the valve is pressure controlled. Providing a pressure-controlled valve has the effect that the axially movable pipe will start retracting once a force from the biasing means in the second tubing portion exceeds the force from the fluid acting on the piston.

In a preferred embodiment, the valve comprises a piston arrangement slidable within a valve housing, wherein the piston arrangement is slidable between a closed first position preventing fluid from passing the valve upon exposure to a fluid pressure being below a predetermined level, and an open second position providing fluid communication between the first tubing portion and the second tubing portion upon exposure to a fluid pressure exceeding the predetermined level.

In a preferred embodiment, the valve comprises a piston arrangement forming part of the first tubing portion. Thus, in one embodiment, the valve is arranged upstream of a flexible and extensible pipe connecting the first tubing portion to the second tubing portion. By providing a valve forming part of the first tubing portion, and also allowing the first tubing portion to be separable from the second tubing portion, the extensible tubing may be adapted for various fluid pressures/hydrostatic columns simply by connecting a first tubing portion provided with a desired valve to the second tubing portion.

In a preferred embodiment, the slidable piston arrangement is operatively connected to the second tubing portion, while the valve housing of the valve is connected to the fluid supplying device. By so doing, the extension of the tubing may also be provided by means of the piston arrangement. Thus, in one embodiment of the extensible tubing, extension of the tubing is provided by means of the axially movable pipe of the second tubing portion, by means of the extensible and flexible pipe connecting the first tubing portion with the second tubing portion, and by means of the valve.

In one embodiment, the piston arrangement of the valve has a first piston area when the valve is in the closed first position, and an additional second piston area when the valve is in the open second position. One effect thereof is that a fluid pressure required for keeping the valve in the open second position (while maintaining a fluid flow) is less than the fluid pressure required for opening the valve. Thus, a differential pressure across the valve may be reduced, whereby less power is required for pumping, and turbulent flow and risk of cavitation are reduced. A reduced differential pressure across the valve may also have a positive effect on any erosion of the valve, and thus on the operating lifetime of the valve.

Preferably, the valve further comprises a biasing means arranged in a chamber defined between a portion of the piston arrangement and the valve housing, and wherein characteristics of the biasing means define said predetermined level of fluid pressure. As will be appreciated by a person skilled in the art, the characteristics of a biasing means, for example a spring, is the dependence of deflection of the spring versus loading force.

Thus, the predetermined pressure level for initiating sliding of the piston arrangement within the valve housing may be controlled by characteristics of the biasing means. The biasing means may be a spring or a compressible fluid, such as a suitable gas. When providing tubing according to the invention for use, for example, on an offshore rig, a biasing means in the form of a spring may be preferred over a compressible fluid. However, a biasing means in the form of a compressible fluid may be used for the tubing according to the present invention.

In one embodiment, the piston arrangement of the valve comprises a hollow piston member provided with at least one aperture in a wall of the hollow piston member, and wherein the at least one aperture is provided in a portion of said wall defined between the first piston area and the additional second piston area. Thus, in such an embodiment, the piston member is utilized as a tubing for flowing fluid downstream of the valve and to the axially movable pipe.

In one embodiment, the piston member is solid in the meaning that any fluid flowing between the inlet and the outlet flows on an outside of the piston member.

In one embodiment, the valve comprises a restrictor arrangement for delaying closing of the valve. Thereby, the piston arrangement does not immediately return from its open second position to its closed first position when the pressure of the fluid upstream of the valve is reduced below the predetermined level. This has the effect that a fluid supply pressure in the fluid supplying device is allowed to bleed off before the valve arrives at its first, closed position.

In one embodiment, the restrictor arrangement is configured for reducing the closing speed of the valve. The valve may return from its open second position to its closed first position at a substantially constant speed.

In an alternative embodiment, the restrictor arrangement may comprise a closing delay nozzle configured for communicating a fluid between two or more fluid reservoirs in response to movement of the piston arrangement. Such fluid reservoirs may, for example, comprise two or more annular chambers surrounding the piston arrangement and containing an incompressible fluid, such as an oil. A closing delay nozzle may further be configured for delaying return of the piston arrangement from its open second position to its closed first position until a predetermined time has lapsed after the pressure of the fluid upstream of the valve has been reduced below the predetermined level. Such a delay nozzle may for example be based on a principle disclosed in U.S. Pat. No. 4,378,612 related to a delayed action door closer.

In one embodiment, the fluid supplying device may comprise a Kelly hose.

The fluid supply pressure is the pressure provided by a pumping device associated with the fluid supplying device and any hydrostatic pressure within the fluid supplying device. By bleeding off the fluid supply pressure, only hydrostatic pressure remains upstream of the valve of the extensible tubing. Thereby, the valve may resist any additional pressure that may arise due to mass acceleration of the fluid column acting on the valve. Such an acceleration may typically arise when a top drive is moved vertically.

Upon reducing the fluid supply pressure below a predetermined level, the valve preferably starts moving from the open second position and arrives at its closed first position before the axially movable pipe of the second tubing portion arrives at its retracted position, wherein the seal prevents fluid from passing between the core and the pipe. Thereby, at least a portion of the fluid within the extensible tubing is allowed to drain.

In a second aspect of the invention, a method of facilitating transfer of fluid between a fluid supplying device and a fluid receiving device is provided, wherein the method comprises the steps of:

- providing an extensible tubing according to the first aspect of the invention;
- connecting the first tubing portion of the extensible tubing to a fluid supplying device, and aligning the second tubing portion of the extensible tubing with respect to a fluid receiving device; and
- supplying a pressurised fluid from the fluid supplying device to the extensible tubing and thus moving the pipe of the second tubing portion from its retracted and sealing position to its extended and open position, thereby allowing fluid to flow through the extensible tubing and into the fluid receiving device.

In one embodiment of the method, the step of supplying the pressurised fluid from the fluid supplying device to the fluid receiving device comprises supplying a balancing liquid via a top drive of a rig structure and into a top portion of a casing string during a casing running operation.

In an alternative embodiment of the method, the step of supplying a pressurised fluid from the fluid supplying device to the fluid receiving device comprises supplying a drilling fluid to a drill string.

BRIEF DESCRIPTION OF THE DRAWINGS

In the following, examples of preferred embodiments are described and illustrated in the accompanying drawings, wherein.

DETAILED DESCRIPTION OF THE EMBODIMENTS

Figure 1A:
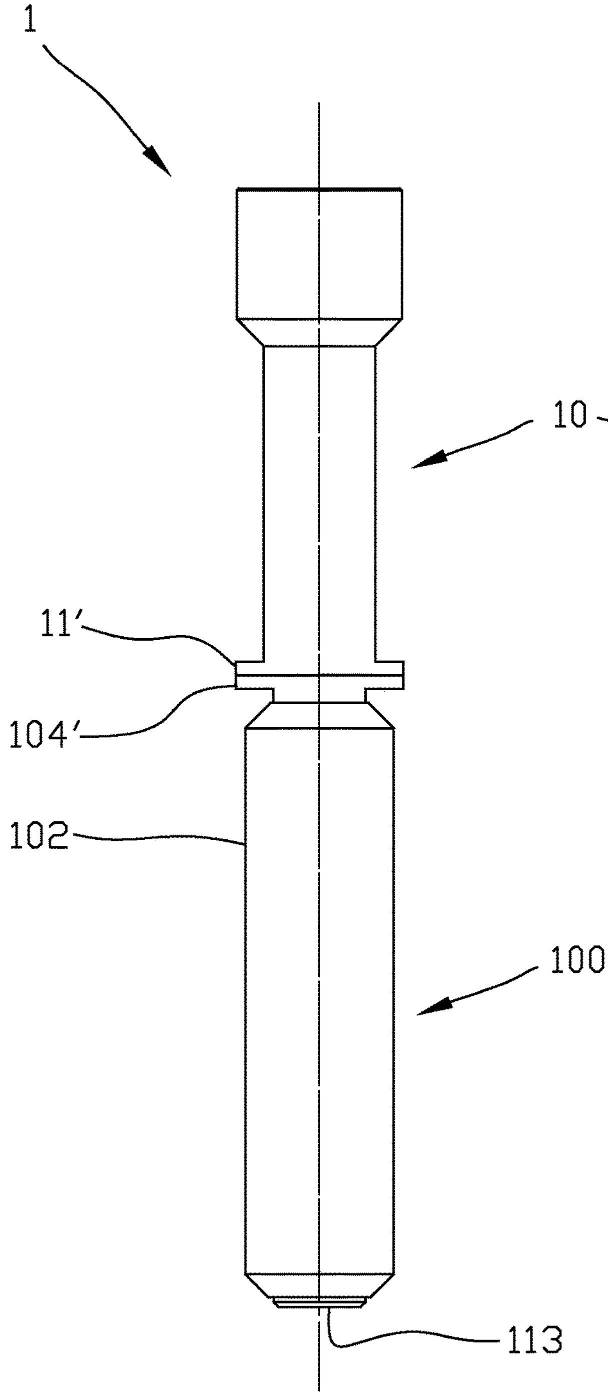
FIG. 1*a* shows a first embodiment of an extensible tubing according to the invention, wherein the tubing is in a retracted position.

Positional indications refer to the positions shown in the figures. Similarly, de-nominations such as upstream and downstream refer to a position of use of the extensible tubing.

In the figures, same or corresponding elements are indicated by same reference numerals. For clarity reasons, some elements may be without reference numerals in some of the figures.

A person skilled in the art will understand that the figures are just principle drawings. The relative proportions of individual elements may also be distorted.

In the figures, reference numeral 1 denotes an extensible tubing according to the present invention. The extensible tubing 1, hereinafter also denoted tubing 1, comprises a first tubing portion 10 connected to second tubing portion 100.

The first tubing portion 10 is provided with an inlet 11, here in the form of a female connector or receptacle 11 configured for threaded connection to a mating male connector of a fluid supplying device (not shown), such as for example a top drive on a drilling rig.

Figure 1B:
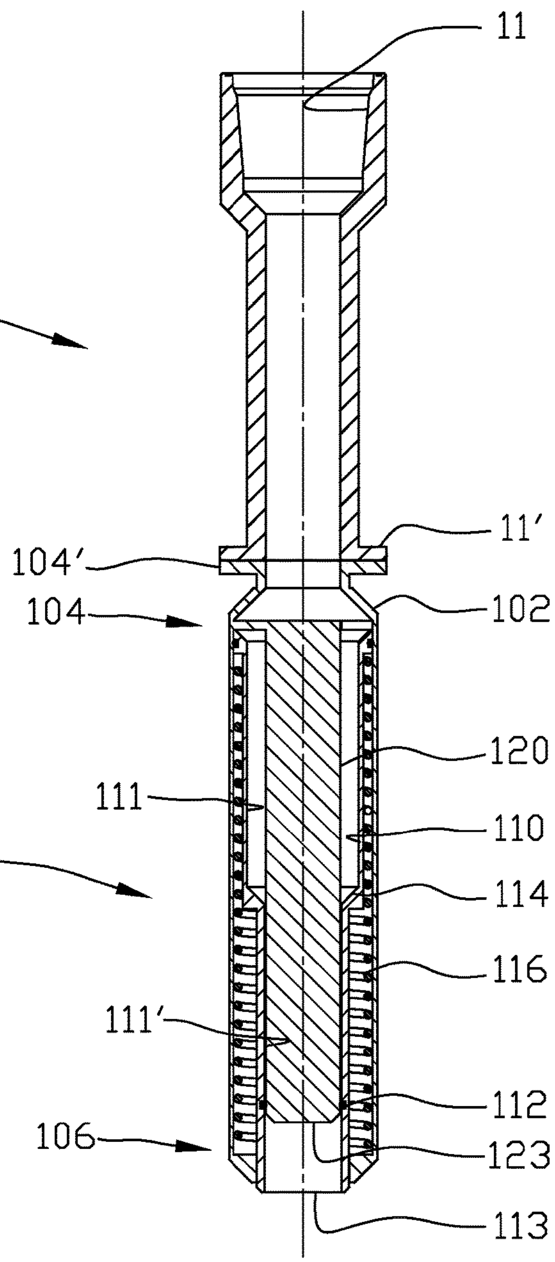
FIG. 1*b* shows a longitudinal cross-sectional view of the tubing in FIG. 1*a;*

In FIGS. 1*a* and 1*b*, the first tubing portion 10 is shown connected to the second tubing portion 100 by mean of bolts (not shown) connecting flanges 104', 11' of the first tubing portion 10 and second tubing portion 100, respectively. In an alternative embodiment, however, the first tubing portion 10 may be connected to the second tubing portion 100 by mean of, for example, a male/female treaded connection.

The second tubing portion 100 comprises a housing 102 having a first end portion 104 and a second end portion 106 located axially opposite the first end portion 104. In the embodiments shown, the first end portion 104 is provided with the flange 104' for directly or indirectly connection to the flange 11' of the first tubing portion 10. In FIG. 1*a*, the flange 104' of the first end portion 104 of the second tubing portion 100 is directly connected to the flange 11' of the first tubing portion 10.

Figure 2A:
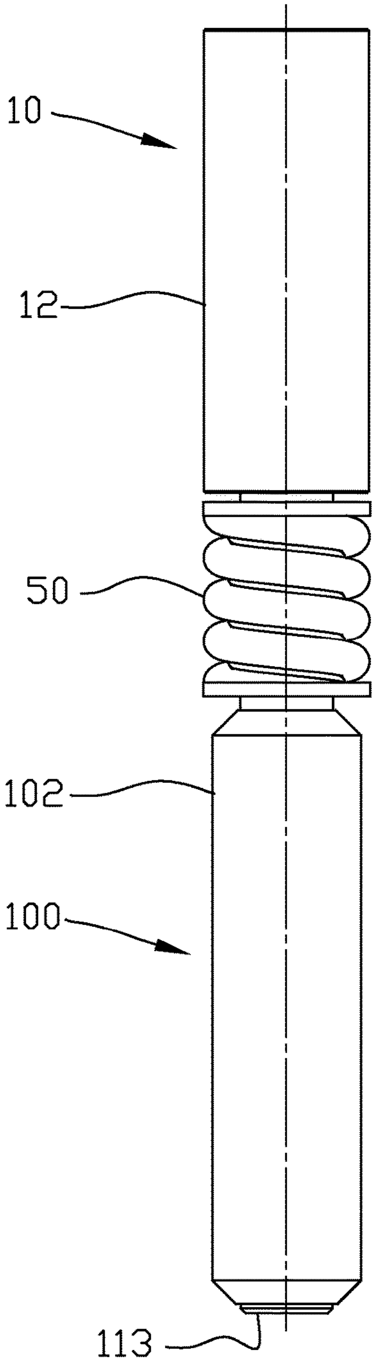
FIG. 2*a* shows a view of a second embodiment of an extensible tubing according to the invention, wherein the tubing is in a retracted position.

In FIG. 2*a*, a flange 104' of the first end portion 104 of the second tubing portion 100 is indirectly connected to a flange 11' of the first tubing portion 10.

Thus, in the embodiments shown, the first tubing portion 10 and the second tubing portion 100 are separable.

The second tubing portion 100 comprises a core 120 arranged inside the housing 102. In the embodiments shown, the tubing 1 has a circular cross-section and the core 120 is made from a circular, solid rod arranged coaxially within the housing 102. A top or upstream portion of the core 120 is secured to a portion of the housing 102, whereby the core 120 may be considered as "hanging" within a housing 102 having a substantially vertical longitudinal axis, or the core 120 may be considered as "cantilevered" within a housing 102 having a substantially horizontal longitudinal axis.

The second tubing portion 100 further comprises a pipe 110 arranged between the housing 102 and the core 120. The pipe 110 is axially movable between a retracted position wherein an annular seal 112 prevents fluid from passing between the core 120 and the pipe 110, and an extended position wherein the seal 112 does not prevent fluid from passing between the core 120 and the pipe 110. FIGS. 1-3*a* and 6*a* show the pipe 110 being in the retracted position, while FIGS. 4-5*b* and 6*b* show the pipe 110 being in the extended position.

The second tubing portion 100 further comprises an internal piston 114 forming part of the pipe 110, and a biasing means 116, here in the form of a spring, configured for urging the pipe 110 towards its retracted position.

The pipe 110 is movable from its retracted position towards its active position when a fluid pressure acting on the piston 114 provides a force exceeding an opposite force from the biasing means or spring 116 configured for urging the pipe 110 towards its retracted position.

In the embodiment shown, the piston 114 is constituted by a transition zone from a larger first pipe portion 111 having a first flow area, and a smaller second pipe portion 111' having a second flow area being smaller than the first flow area. Hereinafter, the larger first pipe portion will also be denoted first piping portion 111, and the smaller second piping portion 111' will also be denoted second piping portion 111'. The first piping portion 111 has an internal diameter being larger than an internal diameter of the second piping portion 111' located downstream of the first piping portion 111.

A cross-sectional area defined by an external surface of the core 120 is smaller than a cross sectional area defined by the internal surface of the second piping portion 111', thereby providing a radial gap for allowing fluid flow between the core 120 and the second piping portion 111'. In the embodiment shown, an annular space is thus defined between the core 120 and the second piping portion 111'. The annular space is larger than a space required for fitting the core 120 within the second piping portion 111'. In a preferred embodiment, a flow area of the annular space is equal to or larger than the flow area of the second piping portion 111'.

Figure 2B:
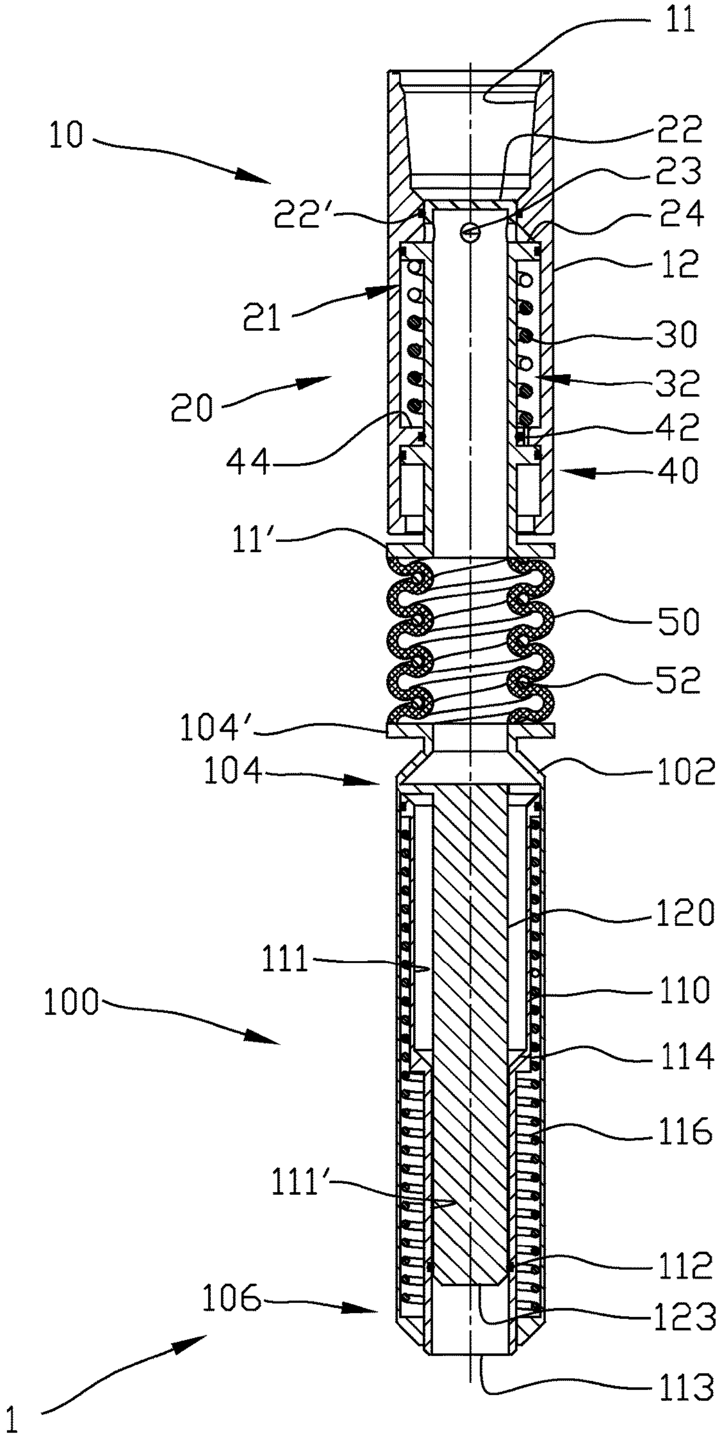
FIG. 2*b* shows a longitudinal cross-sectional view of the tubing in FIG. 2*a*, wherein a top portion of the tubing comprises a valve being in a closed first position.
Figure 3A:
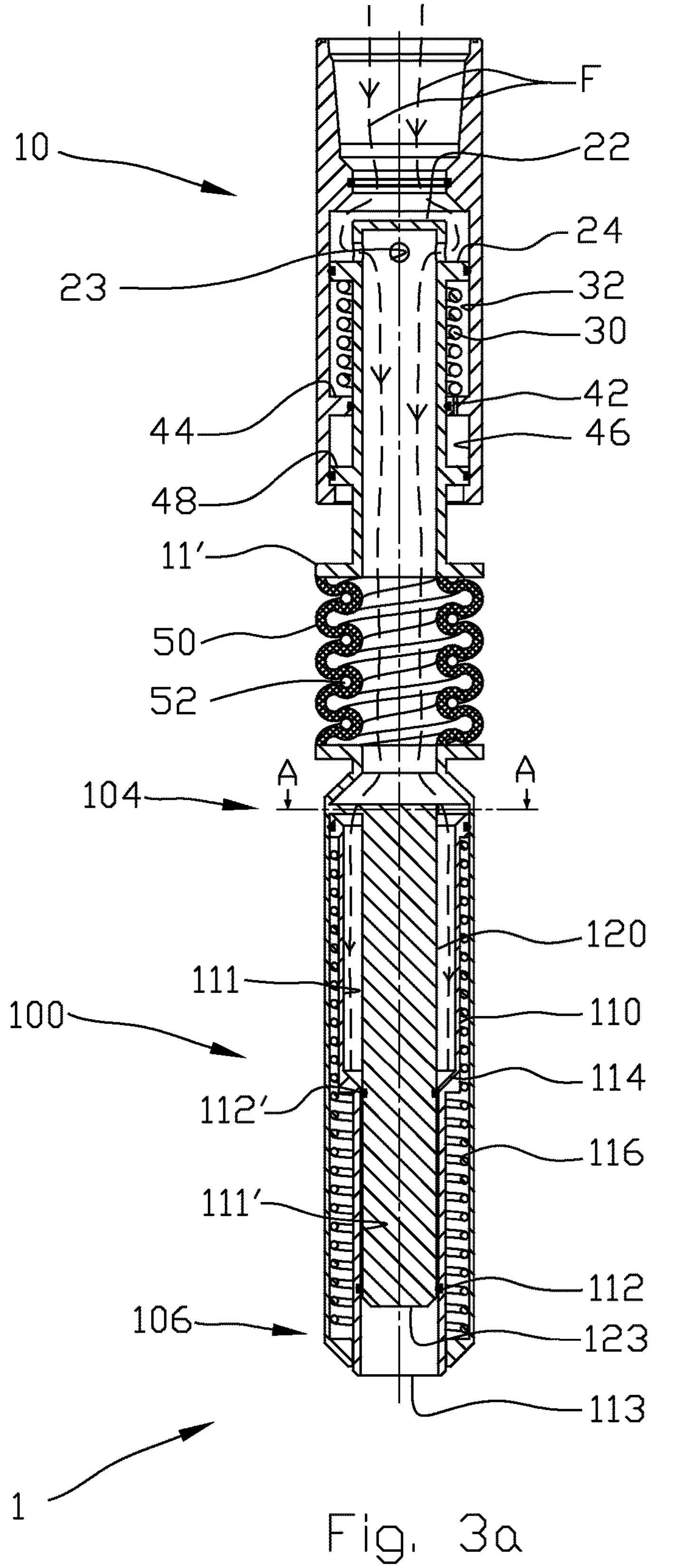
FIG. 3*a* shows the extensible tubing in FIG. 2*b*, wherein the valve in the top portion is in an open second position.
Figure 3B:
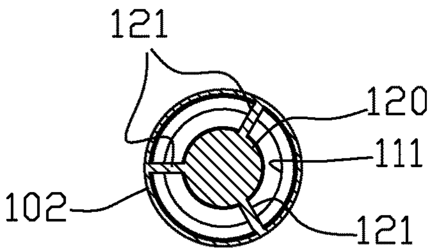
FIG. 3*b* shows a cross-sectional view across A-A in FIG. 3*a;*
Figure 4:
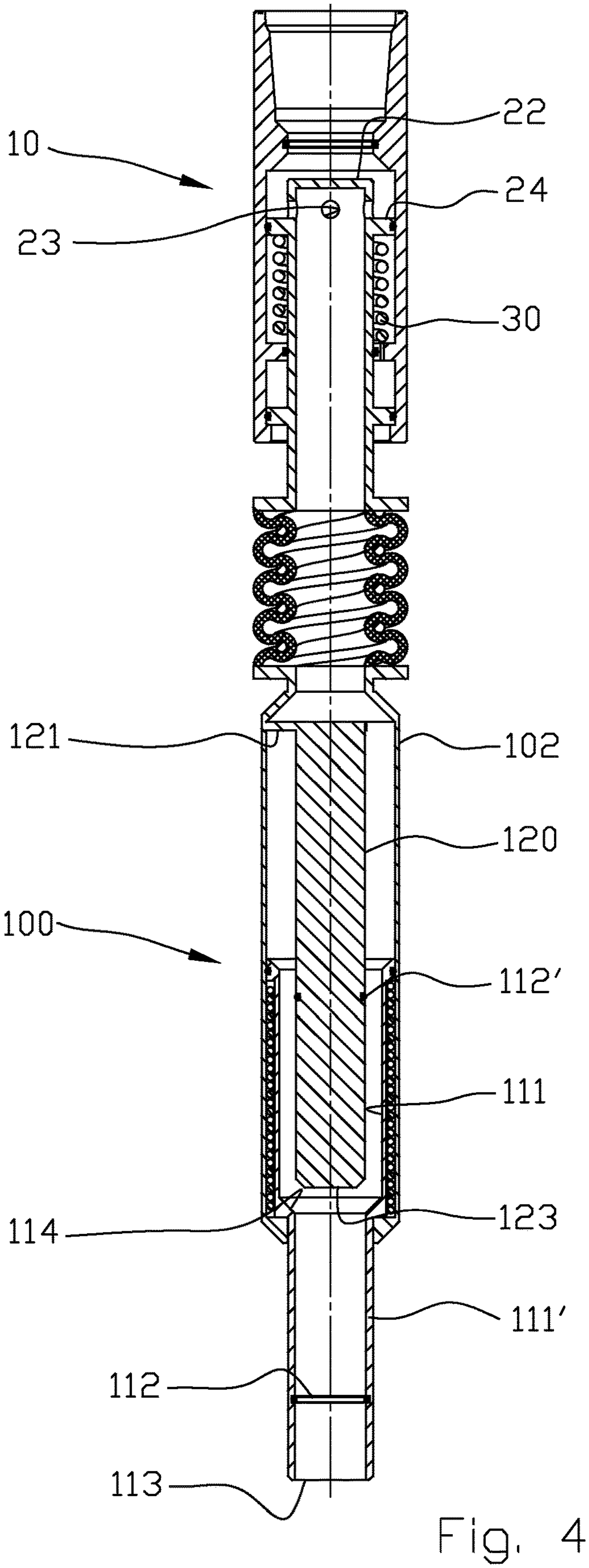
FIG. 4 shows the extensible tubing in FIG. 3*a*, wherein the axially movable pipe is in its extended position.

When fully retracted, as shown inter alia in FIGS. 1*a*-3*a*, an annular seal 112 protruding from an inner surface of the second piping portion 111' abuts against a side portion of the core 120. The annular space between the core 120 and the second piping portion 111' is thus sealed and fluid is prevented from passing through the annular space. In FIGS. 3*a* and 4, a further annular seal 112' is arranged in a recess on the core 120. The further annular seal 112' is arranged on the core 120 to provide a "double seal" once the piston 114 of the second tubing portion 100 has passed the annular seal 112' during retraction of the pipe 110 of second tubing portion 100. Such an arrangement of a further seal 112' may be applicable also for the embodiments shown in FIGS. 1*b*, 2*b*, and 5*b*.

In an alternative embodiment (not shown), the second tubing portion 100 may be provided with the seal 112' arranged in the recess of the core 120 only. In such an alternative embodiment with the seal 112' arranged in the recess on the core 120 only, the seal 112' may be arranged closer to the free end portion 123 of the core 120 than to the position shown in FIGS. 3*a* and 4. However, the axial position of the seal 112' shown in FIGS. 3*a* and 4 has been optimized with respect to drainage of fluid from within the tubing 1 when the pipe 110 retracts from its extended position. The drainage takes place substantially until the pipe 110 is fully retracted.

The annular space defined between the core 120 and the second piping portion 111', as well the arrangement of one or both of the seal(s) 112, 112', are advantageous with respect to drainage of fluid from within the extensible tubing 1 when the pipe 110 retracts from its extended position, as will be discussed below.

In the embodiments shown, the biasing means 116 for urging the pipe 110 towards its retracted position (see for example FIG. 1*b*) is in the form of a helical spring 116 adapted to provide a desired resistance against an opening force defined by a fluid pressure and the area of the piston 114. As an alternative to a spring, the biasing means may be in the form of a compressible fluid, such as a gas.

Figure 6A:
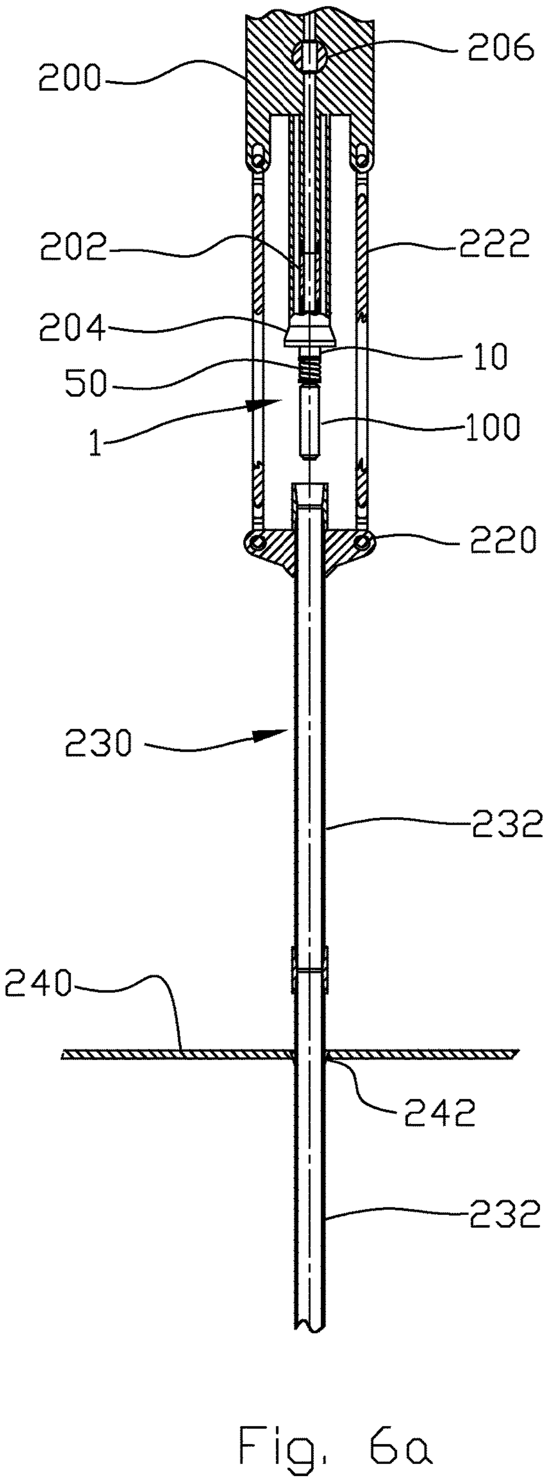
FIG. 6*a* shows, in a smaller scale and partially in cross-section, an example of using the extensible tubing according to an embodiment of the invention, wherein the extensible tubing is in a retracted position above a top portion of a casing string during a running operation.
Figure 6B:
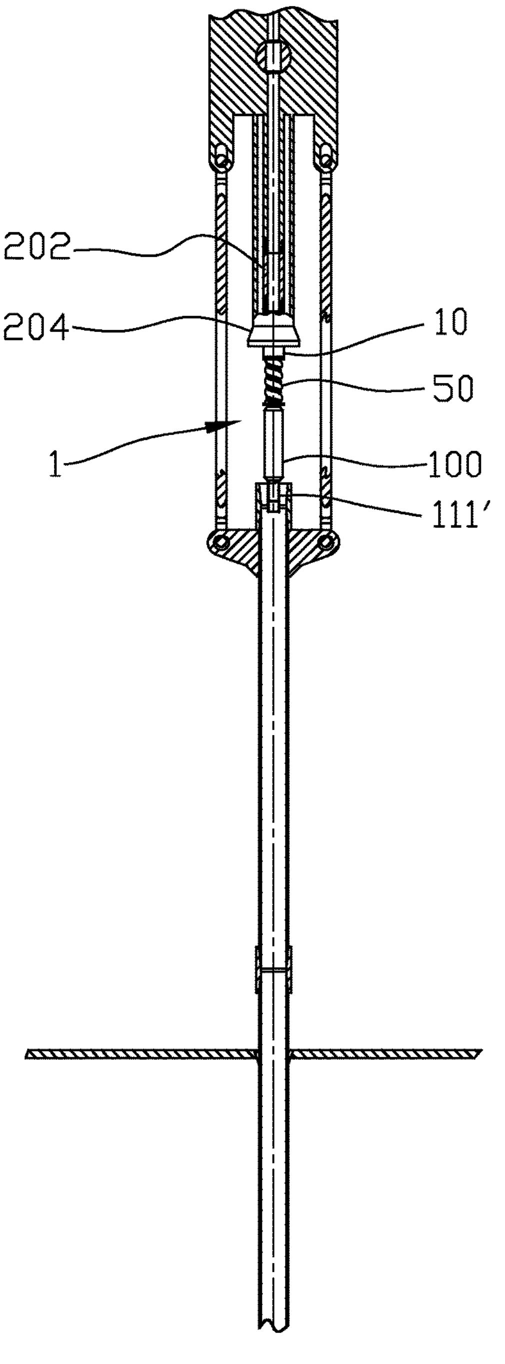
FIG. 6*b* shows the extensible tubing in FIG. 6*a* extended into the top portion of a casing string during the running operation.

In the FIGS. 1*a* and 1*b*, the first tubing portion 10 comprises a tubing provided with an inlet 11, here in the form of a female receptacle provided with internal threads for mating with a male stab of a fluid supplying device, for example a saver sub 202, as shown in FIGS. 6*a* and 6*b*. At an end portion located axially opposite the inlet 11, the first tubing portion 10 is provided with the flange 11' connected to a mating flange 104' in the first end portion 104 of the housing 102 of the second tubing portion 100. In the embodiment shown in FIGS. 1*a* and 1*b*, the first tubing portion 10 is solely a connector or adapter. An advantage of such an adapter is that it can be easily replaced if, for instance, another length is desired, or if the threads in the inlet are damaged, or if another dimension or type of inlet 11 is required.

In some applications, however, the extensible tubing 1 may be subject to a considerable hydrostatic pressure. An example of one such application is a casing running operation in which a fluid column acting on the extensible tubing 1 may be as much as 40 meters, or even more. The fluid may have a specific gravity of up to 2.2 times that of water. It is possible, for example, to design the tubing 1 (see FIG. 1*b*) with a biasing means, for example a spring 116, capable of resisting a force from a static fluid column of 40 meters having a specific gravity of 2.2. The height of the fluid column and its specific gravity will vary considerably, for example from one rig to another. Thus, a great number (or varieties of configurations) of second tubing portions 100 would be required for servicing the marked. Using a valve that forms part of the fluid supplying device to control supply of fluid to the inlet 11 of the tubing 1, could therefore be one way of avoiding or mitigating the force effect of a fluid column acting on the tubing 1. In a casing running operation, an IBOP valve (IBOP—Internal Blowout Preventer) arranged in a top drive (see item 206 in FIGS. 6*a* and 6*b*) would be capable of holding such a fluid column. However, an IBOP valve is a safety device that should be used in an emergency situation only, and a rig operator would normally not allow regular use of an IBOP valve for controlling fluid supply in a casing running operation, or in a drilling operation.

Turning now to FIG. 2*a* et seq, which show a second embodiment of the tubing 1 according to the invention, the first tubing section 10 is provided with a valve 20 for controlling fluid flow through tubing 1. In the embodiment shown, the valve is a pressure-controlled valve 20. Being in the first tubing section 10, the pressure-controlled valve 20 is located upstream of the piston 114 of the axially movable pipe 110.

Figure 7A:
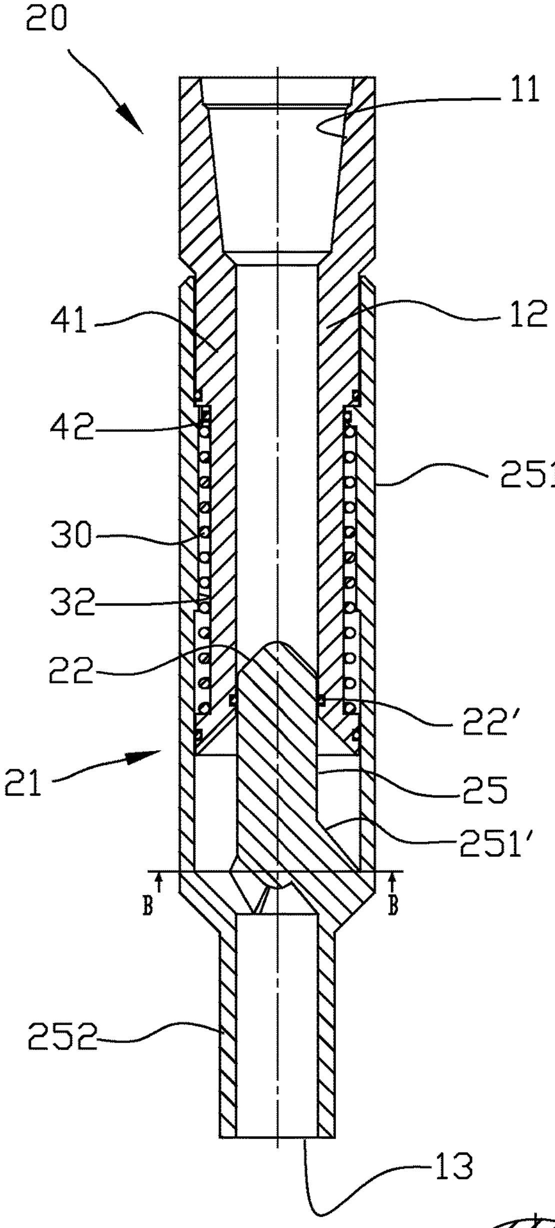
FIG. 7*a* shows a longitudinal cross-section of an alternative embodiment of the valve, wherein the valve is in a closed first position with a portion of the piston member being in a retracted position within a body of the valve.
Figure 7B:
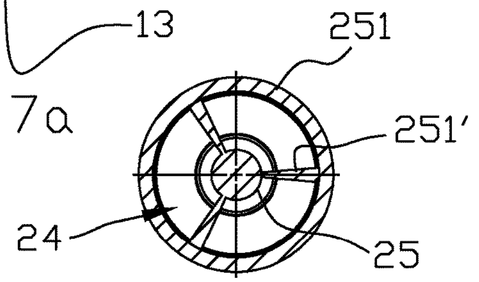
FIG. 7*b* shows a cross sectional view through B-B in FIG. 7*a;*
Figure 7C:
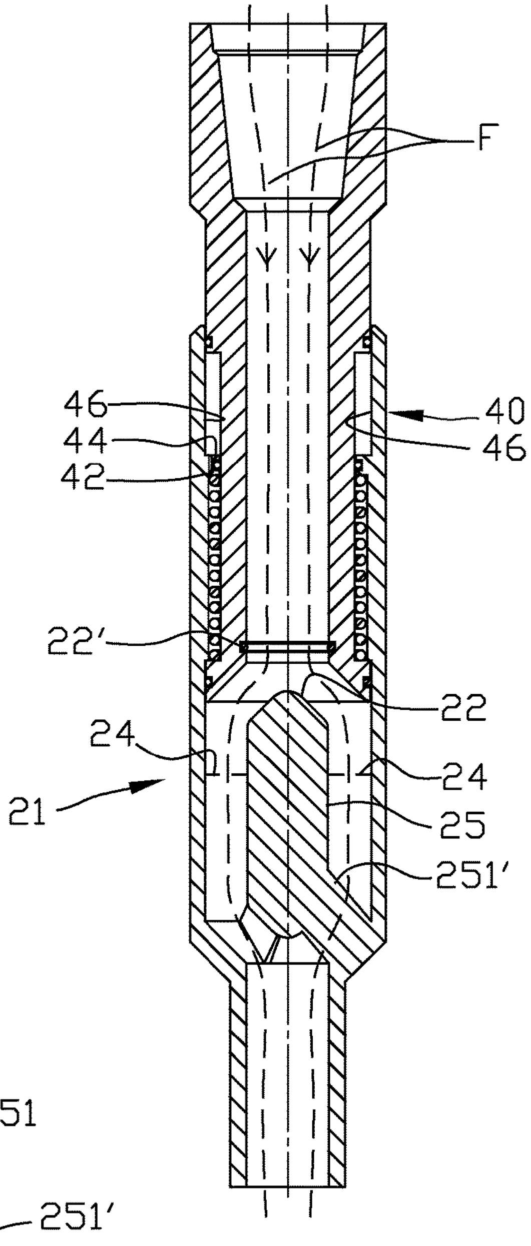
FIG. 7*c* shows the valve in FIG. 7*a* in an open second position with a piston member being in an extended position.
Figure 8A:
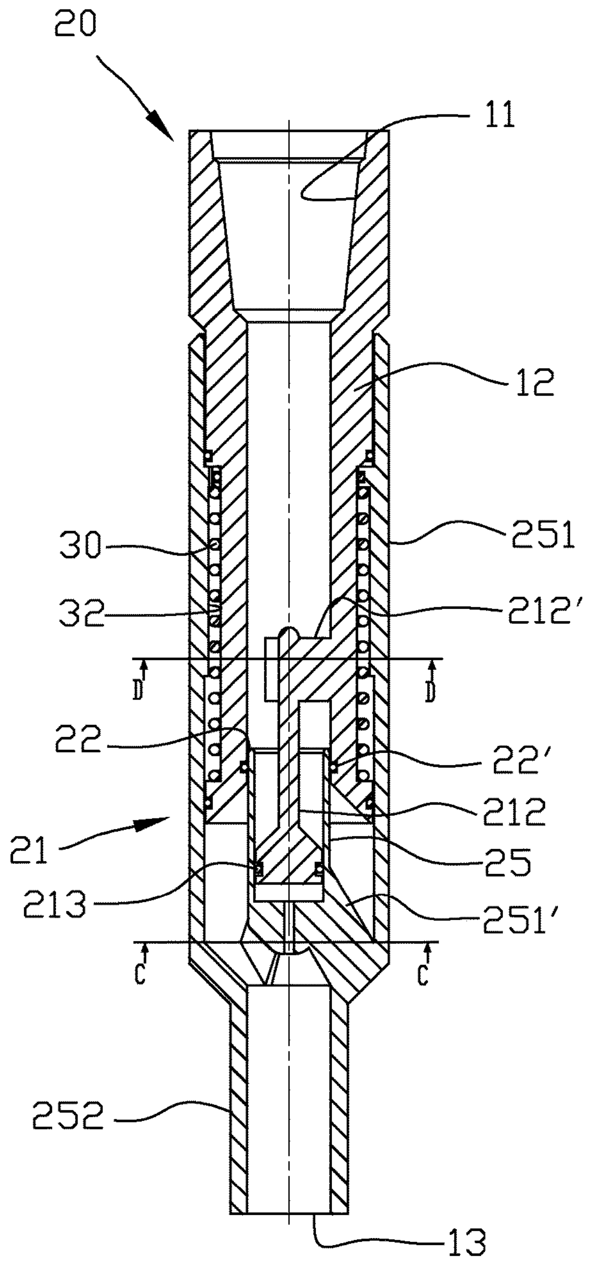
FIG. 8*a* shows a longitudinal cross-section of still another alternative embodiment of the valve, wherein the valve is in a closed first position.
Figure 8D:
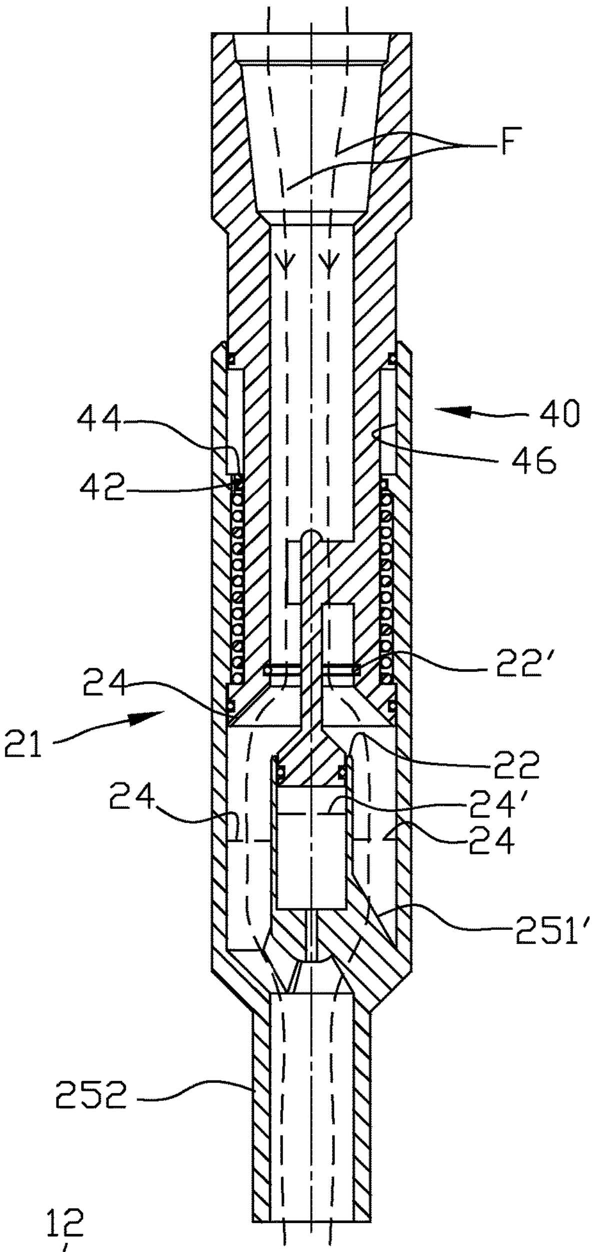
FIG. 8*d* shows the valve in FIG. 8*a* in an open second position.

The pressure-controlled valve 20 comprises a piston arrangement 21 slidable with respect to a valve body 12 between a first position wherein an annular gasket 22' seals against a portion of an inner wall of the valve body 12 (see for example FIGS. 2*b*, 7*a* and 8*a*), and a second position wherein the annular gasket 22' does not seal against a portion of an inner wall of the valve body 12 (see for example FIGS. 3*a*, 7*c* and 8*d*). When being in the first position, the valve 20 prevents fluid from passing the valve 20. The valve 20 is in the closed first position when exposed to a fluid pressure being below a predetermined level. The predetermined level is defined by characteristics of a biasing means 30. The valve 20 is in the open second position, which provides fluid communication between the first tubing portion 10 and the second tubing portion 100, when the valve 20 is exposed to a fluid pressure being above the predetermined level.

In the embodiments shown, the biasing means of the valve 20 is in the form of a spring 30. The spring 30 is housed within a chamber 32 defined between a portion of the piston arrangement 21 and the body 12 of the valve 12. In FIGS. 2*a* to 5*b*, the piston arrangement 21 is surrounded by the valve body in the form of a housing 12. Thus, the chamber 32 is defined between a portion of the piston arrangement 21 and the housing 12. In FIGS. 7*a* to 8*d* is a portion of the valve body 12 surrounded by a portion of the piston arrangement 21. Said portion is hereinafter denoted piston housing 251.

The piston arrangement 21 of the valve 20 has a first piston area 22 facing the inlet of the valve 20 when the valve 20 is in the closed first position, as shown for example in FIGS. 2*b*, 7*a*, and 8*a*, and an additional annular second piston area 24 when the valve 20 is in the open second position, as shown for example in FIGS. 3*a* and 7*c*. In the embodiment shown in FIG. 8*d*, the piston arrangement 21 of the valve 20 is exposed to hydraulic pressure acting on the first piston area 22, the additional annular second piston area 24, and an additional circular second piston area 24', as will be discussed below. Thus, when in a closed first position, as shown in FIGS. 2*b*, 7*a*, and 8*a*, only the first piston area 22 of the valve 20 will be exposed to any fluid in the inlet 11. When the valve 20 is in the closed first position, the annular gasket 22' protects the additional annular second piston area 24, and the additional circular second piston area 24' shown in FIG. 8*d*, from any fluid in the inlet 11.

The piston arrangement 21 of the valve 20 shown in FIGS. 1*b* and 2*b* (and also in FIGS. 3*a* to 7*b*) comprises a piston member 25 that is hollow and being axially movable with respect to the body 12 of the valve 20. A major portion of the hollow piston member 25 is arranged inside the body 12, which in this embodiment forms a piston housing 12. The hollow piston member 25 is provided with apertures 23 in a wall thereof. In the embodiment shown, the number of apertures 23 is four (only three shown) separated at a 90° circumferential spacing. The apertures 23 are provided in a portion of the wall defined between the first piston area 22 and the additional second piston area 24. The number of apertures may be less or more than four, but at least one aperture.

In the alternative embodiment of the valve 20 shown in FIGS. 7*a* to 7*c*, the piston arrangement 21 comprises the piston housing 251, a piston member 25, and a piston outlet 252. The piston member 25 is solid so as to allow the fluid flowing between the inlet 11 and the outlet 13 to pass on an outside of the piston member 25 when the valve 20 is open, as indicated by dotted lines F in FIG. 7*c*. The piston housing 251, the piston member 25, and the piston outlet 252 are operatively connected to each other, wherein the piston member 25 is arranged between the piston housing 251 and the piston outlet 252. A portion of the piston housing 251 surrounds the body 12 of the valve 20. The piston arrangement 21 is axially movable with respect to the body 12 from a closed first position, as shown in FIG. 7*a*, and an open second position, as shown in FIG. 7*c*. The piston member 25 is secured to a lower portion of piston housing 251 via fins 251', as best seen in FIG. 7*b*.

The piston arrangement 21 shown in FIGS. 7*a* to 7*c*, has a first piston area 22 defined by the portion of the piston member 25 facing the inlet 11 of the valve 20, and an additional annular second piston area 24 defined between an inner surface of the piston housing 251 and an outer surface of a side portion of the piston member 25. In the embodiment shown, the additional annular second piston area 24 is indicated by dotted lines 24 in FIG. 7*c*.

When the valve 20 is in the closed first position, as shown in FIG. 7*a*, any fluid pressure from the fluid supply device acts towards the first piston area 22 only. When the valve 20 is in the open second position, as shown in FIG. 7*c*, the fluid pressure acts on both the first piston area 22 and the additional annular second piston area 24.

Figure 8B:
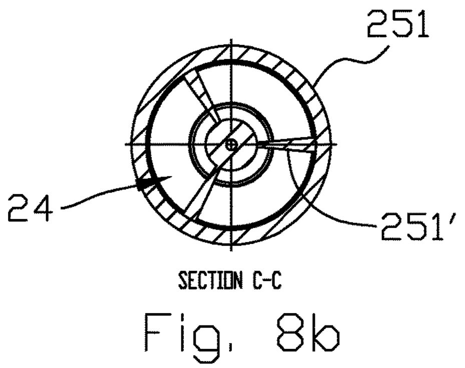
FIG. 8*b* shows a cross sectional view through C-C in FIG. 8*a;*
Figure 8C:
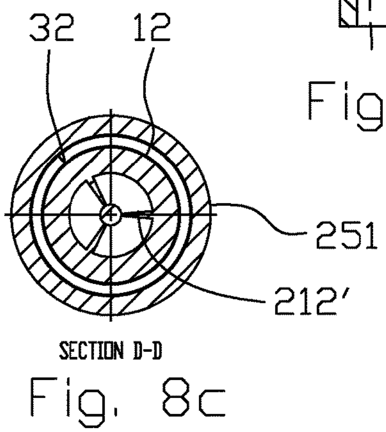
FIG. 8*c* shows a cross sectional view through D-D in FIG. 8*a*.

Turning now to FIGS. 8*a* to 8*d*, which show another embodiment of the valve 20. Similar to the embodiment shown in FIGS. 7*a* to 7*c*, the piston arrangement 21 comprises a piston housing 251, a piston member 25, and a piston outlet 252. However, the piston member 25 is formed as a sleeve or ring piston 25 housing a portion of a static member 212, which is secured to a portion of the body 12 via fins 212' protruding from an inner portion of the body 12. The fins 212' are best seen in FIG. 8*c*.

A seal 213 prevents fluid from passing between the ring piston 25 and the static member 212. When the valve 20 is in the open second position, as shown in FIG. 8*d*, the fluid flowing between the inlet 11 and the outlet 13 passes on an outside of the ring piston 25, as indicated by dotted lines F in FIG. 8*d*. The piston housing 251, the piston member (ring piston) 25, and the piston outlet 252 are operatively connected to each other, wherein the piston member 25 is arranged between the piston housing 251 and the piston outlet 252. A portion of the piston housing 251 surrounds the body 12 of the valve 20. The piston arrangement 21 is axially movable with respect to the body 12 from a closed first position, as shown in FIG. 8*a*, and an open second position, as shown in FIG. 8*d*. The piston member 25, here the ring piston 25, is secured to a lower portion of piston housing 251 via fins 251', as best seen in FIG. 8*b*.

The piston arrangement 21 shown in FIGS. 8*a* to 8*d*, has a first piston area 22 defined by the portion of the ring piston 25 facing the inlet 11 of the valve 20, an additional annular second piston area 24 defined between an inner surface of the piston housing 251 and an outer surface of a side portion of the piston member 25 (ring piston 25), and an additional circular second piston area 24' defined by the inner wall of the ring piston 25. In the embodiment shown, the annular second piston area 24 and the circular second piston area 24' are indicated by dotted lines 24, 24' in FIG. 8*d*.

When the valve 20 is in the closed first position, as shown in FIG. 8*a*, any fluid pressure from the fluid supply device acts towards the first piston area 22 only. When the valve 20 is in the open second position, as shown in FIG. 8*d*, the fluid pressure acts on both the first piston area 22, and the additional annular and circular second piston areas 24, 24'.

For all three embodiments of the valve 20 discussed above, the following ap-plies:

When a fluid pressure acting on the first piston area 22 provides a force exceeding an oppositely directed force from the spring 30, the piston arrangement 21 will move from the closed first position, as shown in FIGS. 2*b*, 7*a* and 8*a*, to an open second position, as shown in for example FIGS. 3*a*, 7*c* and 8*d*. When the valve 20 opens, referring now to the embodiment shown in FIG. 3*b*, the fluid will flow through the apertures 23 into the hollow piston member 25, via a flexible pipe 50, and into the second tubing portion 100. In FIGS. 3*a*, 7*c* and 8*d*, such a fluid flow is illustrated by dotted lines F. The fluid flows past core securing rods 121 connecting the core 120 to the surrounding housing 102, as best seen in FIG. 3*b*. In an embodiment wherein the valve is as shown in FIG. 7*c* or FIG. 8*d*, for example, the fluid will flow on the outside of the piston member 25 and through the outlet 13 of the valve 20, and further into the second tubing portion 100. It should be noted that the valve 20 shown in FIGS. 7*a* to 8*d* comprises a flange (not shown) similar to the flange 11' shown in FIGS. 2*b* and 3*a*.

Due to the additional second piston area 24, and for the embodiment shown in FIG. 8*d*, the additional circular second piston area 24', which adds (or in FIG. 8*d* add) to the first piston area 22 once the valve 20 opens, the fluid pressure required for keeping the valve 20 in the open second position becomes less than the fluid pressure required for opening the valve 20. This means that the valve 20 may be configured for holding a desired fluid column, further implying that the fluid pumping pressure required for opening the valve 20 may be reduced once the valve 20 starts opening, which allows the valve 20 to operate at a reduced fluid pressure while feeding fluid via the extensible tubing and into, for example, a casing string during a casing running operation. A reduced pumping pressure results in reduced differential pressure across the valve 20, which may have a positive effect on any erosion of the valve 20, and thus on the operating lifetime of the valve 20. A reduced differential pressure across the valve 20 may further have a positive effect with respect to reduced turbulent flow and reduced cavitation. From the embodiments of the valve 20 discussed above, the embodiment shown in FIGS. 8*a* to 8*d* provides the largest difference between the first piston area 22 and the sum of the first piston area 22 and the additional second annular and circular piston area 24, 24'. A large difference between the first piston area 22 and the sum of the first piston area 22 and the additional second annular and circular piston areas 24, 24' has the positive effect that the resistance from the spring 30 can be reduced as compared with embodiments wherein the differences between the areas 22, 24 are less, as shown in FIGS. 7*a* to 7*c*, and particularly in FIGS. 2*b*, 3*a*, and 4. A reduced resistance from the spring has the effect that the fluid supply pressure can be reduced. A reduced supply pressure may be positive with respect to the lifetime of the valve, as discussed above. As an alternative to reducing the resistance from the spring 30, and thus the fluid supply pressure, the fluid supply pressure for opening the valve 20 can be increased.

Independently of reducing the resistance from the spring 30 or increasing the pressure from the fluid supply device, typically by increasing the pumping pressure, the following positive effect is achieved: Due to the relatively large differences between the first piston area 22 and the sum of the first piston area 22 and the additional annular and circular second piston areas 24, 24' shown in FIGS. 8*a* to 8*d*, a correspondingly large difference in pressure from the fluid supply device may be applied for opening the valve 20 and keeping the valve 20 open. Thus, a fluid supply pressure from for example a pumping device may be considerably reduced once the valve 20 opens.

Once the valve 20 in the embodiments discussed above opens, a fluid pressure will flow into the second tubing portion 100. If the fluid pressure acting on the piston 114 of the pipe 110 provides a force exceeding an oppositely directed force from the spring 116, the pipe 110 will move from the position shown in FIG. 3*a* to the position shown in, for example, FIG. 4. In FIG. 4, the pipe 110 is in its fully extended position, wherein the piston 114 is positioned axially downstream of a free end portion 123 of the core 120, thereby providing a fully open flow passage through the tubing 1.

In FIG. 4, the tubing 1 has been extended by the travelling length of the pipe 110 with respect to the housing 102, plus the travelling length of the piston arrangement 21 with respect to the valve body 12 of the valve 20.

In the embodiment shown in FIG. 2*b*, for example, the chamber 32 housing the valve spring 30 is configured to contain a substantially incompressible fluid, for example an oil. The chamber 32 is in fluid communication with a restrictor arrangement 40 for delaying closing of the valve 20 to allow a fluid supply pressure to bleed off. Seals for preventing leak-ages are shown in the figures, but not discussed in any further details given that such seals will be apparent for a person skilled in the art.

In the embodiments of the valve shown in FIGS. 2*b*, 7*a* and 8*a*, for example, the restrictor arrangement 40 comprises a closing delay nozzle 42 extending from an end portion of the chamber 32, further through an annular lip portion or piston 44 extending radially with respect to the valve body 12, and onto a variable volume reservoir 46, as seen for example in FIG. 3*a*. Alternatively, however, the restrictor arrangement may comprise a flow choke valve or other means commercially available in the marked for reducing, for example, a flow velocity through the restrictor arrangement 40 and thus reduce the closing speed of the valve 20. Alternatively, or additionally, the restrictor arrangement 40 may be configured for delaying return of the piston arrangement from its open second position to its closed first position until a predetermined time has lapsed after the pressure of the fluid upstream of the valve has been reduced below the predetermined level.

The variable volume reservoir 46 is in the embodiment shown in FIG. 3*a* defined by a piston member lip 48 protruding radially outward from the piston member 25, and the internal wall of the valve body 12. The piston member lip 48 has an active face for receiving any fluid from the chamber 32, and a passive face opposite the active face. The passive face of the piston member lip 48 is in fluid communication with ambient air.

In the embodiments shown in FIGS. 7*c* and 8*d*, the variable volume reservoir 46 is defined by the annular lip portion 44 protruding radially inward from the piston housing 251, an internal wall of the piston housing 251, a shoulder portion of the body 12, and the external wall of the valve body 12.

Although FIGS. 2*a* to 5*b* show only one type of valve, it should be clear that the alternative valves 20 shown in FIGS. 7*a* to 7*c*, and in FIGS. 8*a* to 8*d*, may form part of the extensible tubing 1 according to the invention.

When the valve 20 is in the first closed position, as shown in FIGS. 2*b*, 7*a* and 8*a*, a volume of the variable volume reservoir 46 is close to zero.

When the valve 20 opens in response to a fluid pressure, a volume of the chamber 32 is reduced and any fluid within the chamber 32 is urged from the chamber 32 and into the variable volume reservoir 46 via the closing delay nozzle 42. In the embodiment shown in FIG. 3*a*, the piston arrangement 21 has moved axially downward to a position wherein the piston member lip 48 abuts against a shoulder at a lower end portion of the valve body 12.

In FIGS. 7*c* and 8*d*, the piston arrangement 21 has moved axially downward to a position wherein a shoulder of the valve housing 251 abuts against a shoulder at a lower end portion of the valve body 251.

In FIGS. 3*a*, 7*c* and 8*d*, a volume of the variable volume reservoir 46 is at its maximum.

Upon exposing the valve 20, and thus the extensible tubing 1, to a fluid pressure force being less than the force from the spring 30, the valve 20 will start closing. When the valve 20 starts closing, the fluid within the variable volume reservoir 46 must pass the closing delay nozzle 42, which provides a delay in the closing of the valve 20. Due to the delay in closing the valve 20, also the axial movement of the pipe 110 of the second tubing portion 100 is delayed. Since fluid is allowed to pass the gap between the core 120 and the smaller pipe portion 111' of the second pipe portion 100, the delay in axial movement of the pipe 110 allows excess pressure to be bled off in the fluid supplying device. Pressure is bled off until the seal 112 of the pipe 110 once again seals against the core 120. In a preferred embodiment, and upon exposing the valve 20 to a fluid pressure force being less than the force from the spring 30, the extensible tubing 1 is configured in a manner allowing the valve 20 to arrive at its closed first position before the seal 112 of the pipe 110 seals against the core 120. This sequence of closing the extensible tubing 1 is controlled, inter alia, by the configuration of the springs 30, 116, the piston areas 22, 24 of the piston arrangement 21, the area of the piston 114, and the restrictor arrangement 40.

In one embodiment, the closing delay nozzle 42 is provided with a check-valve (not shown) configured for providing one-way delay, and only so that substantially no delay is provided when the valve 20 opens and moves from the position shown in, for example, FIG. 2*b* to the position shown in FIG. 3*a*.

Figure 5A:
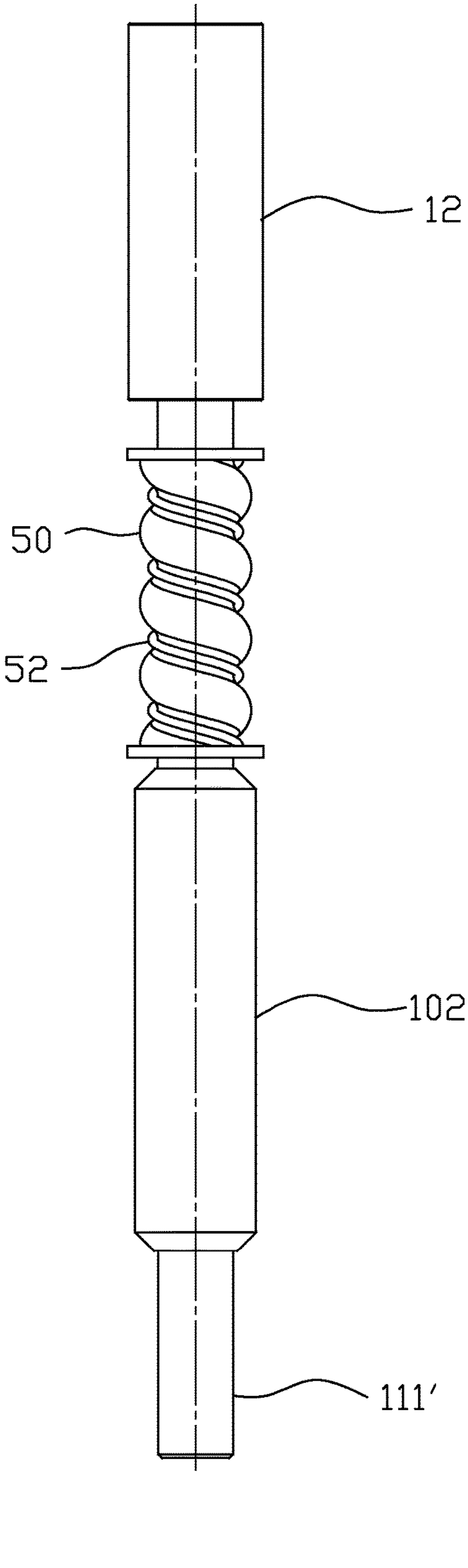
FIG. 5*a* shows, in a somewhat smaller scale, a view of an extensible tubing according to the second embodiment of the invention, wherein the tubing is in a fully extended position.
Figure 5B:
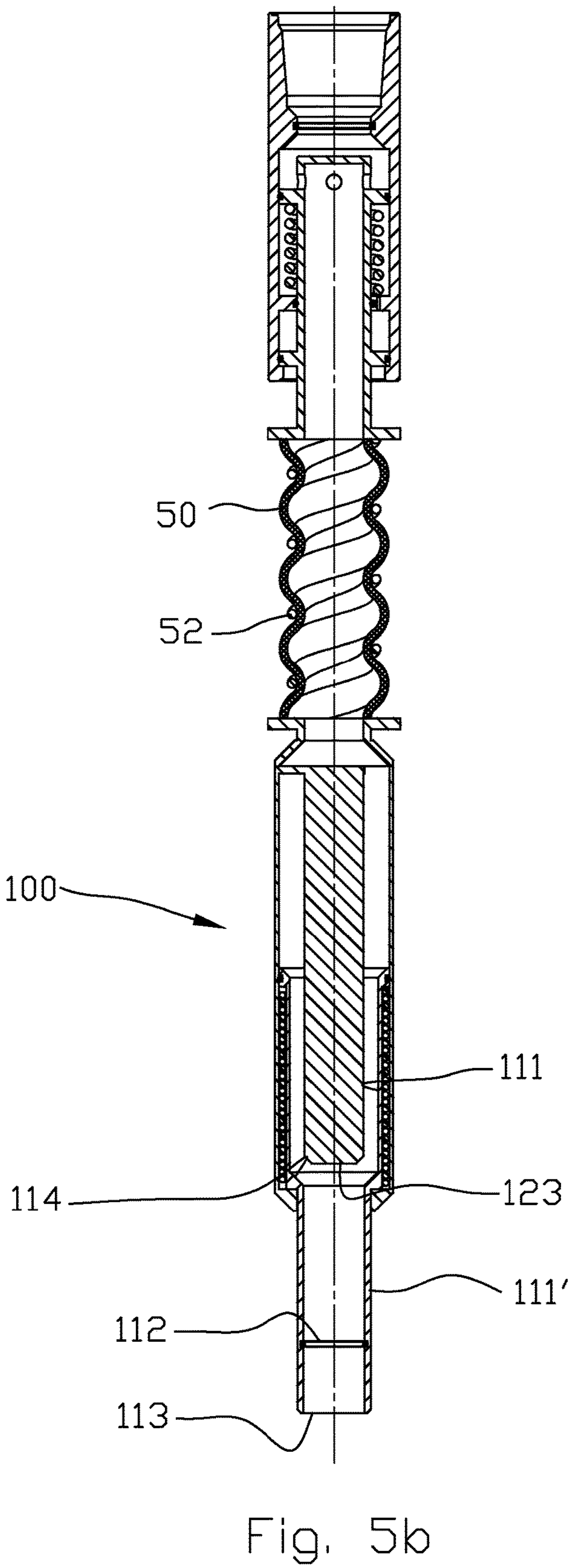
FIG. 5*b* shows a longitudinal cross-sectional view of the tubing in FIG. 5*a;*

In FIGS. 5*a* and 5*b*, a force from the fluid flow through the tubing 1 has exceeded counteracting forces from the spring 30 of the valve 20, the spring 116 of the second tubing portion 100, and a force from a spring 52 arranged in connection with the flexible pipe 50. In FIGS. 5*a* and 5*b*, the tubing 1 is at its maximum extension, which is provided by means of the extension of the flexible pipe 50 in addition to the extension of the second tubing portion 100, as shown in FIG. 4.

FIGS. 6*a* and 6*b* show, in a smaller scale and partially in cross-section, an embodiment wherein the present extensible tubing 1 is in a retracted position and extended position, respectively, above a top portion of a casing string 230 during a casing running operation.

In the example shown in FIGS. 6*a* and 6*b*, the extensible tubing 1 is operatively connected to a top drive 200 of a rig. The extensible tubing 1 is of the type shown in FIGS. 2*a*-5*b*. A top portion of the first tubing portion 10 is connected to a saver sub 202 housed within a skirt 204. For illustrative purposes, the skirt 204 is shown partially in section, and the top portion of the extensible tubing 1 (which comprises the valve 20) is housed within a lower portion of the skirt 204. The top drive 200 further comprises an IBOP valve 206 (IBOP—Internal Blowout Preventer) configured for closing a fluid flow in the event of an emergency situation, and particularly in a drilling operation wherein fluid may flow from a subsea reservoir and up to the rig.

An elevator 220, which is operatively connected to the top drive 200 via a pair of bails 222, carries the casing string 230. The casing string 230 is made up by connecting casing sections 232 (two sections shown) on top of the casing string 230 during a casing running operation, as will be appreciated by a person skilled in the art.

During the casing running operation, a balancing fluid must be supplied to the casing string 230. By means of the extensible tubing 1, the casing string 230 can be continuously filled, both during make-up of the connection of two casing sections 232 and thereafter during running into the well.

In FIG. 6*a*, the extensible tubing 1 is in a fully retracted position, whereby both the pipe 110 (see for example FIG. 3*a*) of the second tubing portion 100 and the flexible pipe 50 are in retracted positions Thus, in FIG. 6*a*, there is no fluid flow through the tubing 1.

In FIG. 6*b*, a fluid pressure of the fluid located upstream of the first tubing portion 10 has been increased, for example by means of a pump operatively connected to the fluid supplying device. The fluid pressure has been increased to a level wherein the valve 20 of the first tubing portion 10 has been urged from a closed first position (see details in FIG. 2*b*) to an open second position (see details in FIG. 3*a*).

When the valve 20 opens, fluid flows into the pipe 110 of the second tubing portion 100. If the fluid flow pressure acting on the piston 114 provides a force exceeding the force from the spring 116 within the second tubing portion 100, and also the force from the spring 52 of the flexible pipe 50, both the pipe 110 and the flexible pipe 50 are displaced axially to their extended positions. In said extended positions, as shown in FIG. 6*b*, the free end 113 of the (smaller) second pipe portion 111' has entered into a top portion of the uppermost casing section 232. Thus, in FIG. 6*b*, the apparatus 1 is shown in the extended position, as also shown in further details in FIG. 5*b*. In FIG. 6*b*, there is a sideway clearance between the second pipe portion 111' and the uppermost casing section 232 so that the casing section 232 does not represent any obstruction when the extensible tubing 1 is moved from its fully retracted position (see FIG. 6*a*) to its extended position, and from its extended position to its fully retracted position. The sideway clearance has a further effect that any sideways movement of the extensible tubing 1 does not influence any axial alignment between the uppermost casing section 232 and the casing secured to the drill floor 240 via slips 242 (see FIG. 6*a*), during make-up of the connection of the casing sections 232. It should be noted that the sideway clearance is preferred also in an embodiment wherein the extensible tubing 1 is not provided with the flexible pipe 50.

From the disclosure herein, it should be appreciated that the extensible tubing 1 according to the invention is fully automatic, implying that the extensible tubing 1 may be controlled by fluid pressure within the fluid supplying device only. In one embodiment, at least some of the fluid within the extensible tubing 1 is allowed to drain during movement from its extended position to its fully retracted position, whereby any spill of fluid is substantially eliminated. In an advantageous embodiment, the extensible tubing 1 according to the invention is provided with a valve 20 configured to allow the fluid pressure of the fluid flowing into the inlet of the extensible tubing 1 to be reduced once the valve 20 has started opening.

It should be noted that the above-mentioned embodiments illustrate rather than limit the invention, thereby allowing those skilled in the art to design many alternative embodiments without departing from the scope of the appended claims. In the claims, any reference signs placed between parentheses shall not be construed to limit the claim. Use of the verb "comprise" and its conjugations do not exclude the presence of elements or steps additional to those stated in a claim. The article "a" or "an" preceding an element does not exclude the presence of a plurality of such elements.

The invention claimed is:

1. An extensible tubing for facilitating transfer of fluid between a fluid supplying device and a fluid receiving device, the extensible tubing comprising a first tubing portion for connection to the fluid supplying device and for receiving a fluid therefrom, and a second tubing portion for communicating the fluid to the fluid receiving device, wherein the second tubing portion comprises:

a housing having a first end portion and a second end portion;

a core arranged inside the housing and secured thereto;

a pipe arranged between the housing and the core, the pipe being axially movable between a retracted position wherein at least one seal prevents fluid from passing between the core and the pipe, and an extended position wherein the seal does not prevent fluid from passing between the core and the pipe;

a piston forming a part of the pipe; and a biasing means configured for urging the pipe towards its retracted position;

wherein the pipe is movable towards its extended position upon exposure to a fluid pressure force exceeding an opposite force from the biasing means;

wherein the piston is formed by a transition zone from a larger first pipe portion having a first flow area defined between the first pipe portion and the core, and a smaller second pipe portion having a second flow area defined between the second pipe portion and the core, the second flow area being smaller than the first flow area; and wherein the at least one seal is configured for sealing between the smaller second pipe portion and the core when the pipe is closer to its retracted position than to its extended position.

2. The extensible tubing according to claim 1, wherein the smaller second pipe portion has a free end, and wherein the seal is arranged within the smaller second pipe portion and closer to its free end than to the piston.

3. The extensible tubing according to claim 2, wherein the seal is arranged on a portion of the core wherein the seal engages the smaller second pipe portion when the extensible tubing is closer to its fully retracted position than to its fully extended position.

4. The extensible tubing according to claim 2, wherein the core has a free end portion pointing away from the first tubing portion, and wherein the piston is positioned on the pipe so as to extend beyond the free end portion of the core when the pipe is in its extended position.

5. The extensible tubing according to claim 1, wherein the seal is arranged on a portion of the core wherein the seal engages the smaller second pipe portion when the extensible tubing is closer to its fully retracted position than to its fully extended position.

6. The extensible tubing according to claim 1, wherein the core has a free end portion pointing away from the first tubing portion, and wherein the piston is positioned on the pipe so as to extend beyond the free end portion of the core when the pipe is in its extended position.

7. The extensible tubing according to claim 1, wherein the first tubing portion is a separate tubing portion connected to the second tubing portion.

8. The extensible tubing according to claim 7, wherein the first tubing portion is connected to the second tubing portion via a flexible pipe.

9. The extensible tubing according to claim 8, wherein the flexible pipe is axially extensible between a retracted position and an extended position.

10. The extensible tubing according to claim 9, wherein the flexible pipe comprises a biasing means configured for urging the flexible pipe towards a retracted position upon exposure to an opposite tension force between the first tubing portion and the second tubing portion being less than a biasing force of the biasing means.

11. The extensible tubing according to claim 1, wherein the extensible tubing comprises a valve for controlling fluid flow through the extensible tubing, the valve being arranged upstream of the piston of the axially movable pipe of the second tubing portion.

12. The extensible tubing according to claim 11, wherein the valve is arranged in the first tubing portion.

13. The extensible tubing according to claim 11, wherein the valve comprises a piston arrangement slidable with respect to a valve body, wherein the piston arrangement is slidable between a closed first position preventing fluid from passing the valve upon exposure to a fluid pressure being below a predetermined level, and an open second position providing fluid communication between the first tubing portion and the second tubing portion upon exposure to a fluid pressure exceeding the predetermined level.

14. The extensible tubing according to claim 13, wherein the piston arrangement of the valve has a first piston area when the valve is in the closed first position, and an additional second piston area when the valve is in the open second position.

15. The extensible tubing according to claim 14, wherein the piston arrangement of the valve comprises a hollow piston member provided with at least one aperture in a wall of the hollow piston member, and wherein the at least one aperture is provided in a portion of said wall defined between the first piston area and the additional second piston area.

16. The extensible tubing according to claim 13, wherein the valve comprises a biasing means arranged in a chamber defined between a portion of the piston arrangement and the valve housing, and wherein characteristics of the biasing means define said predetermined level of fluid pressure.

17. The extensible tubing according to claim 11, wherein the valve comprises a restrictor arrangement for delaying closing of the valve to allow a fluid pressure to bleed off.

18. A method of facilitating transfer of fluid between a fluid supplying device and a fluid receiving device and a fluid receiving device, wherein the method comprises the steps of:

providing an extensible tubing according to claim 1;

connecting the first tubing portion of the extensible tubing to a fluid supplying device, and aligning the second tubing portion of the extensible tubing with respect to a fluid receiving device; and supplying a pressurised fluid from the fluid supplying device to the extensible tubing and thus moving the pipe of the second tubing portion from its retracted and sealing position to its extended and open position, thereby allowing fluid to flow through the extensible tubing and into the fluid receiving device.

19. The method according to claim 18, wherein supplying the pressurised fluid from the fluid supplying device to the fluid receiving device comprises supplying a balancing liquid via a top drive of a rig structure and into a top portion of a casing string during a casing running operation.

20. The method according to claim 18, wherein supplying the pressurised fluid from the fluid supplying device to the fluid receiving device comprises supplying a drilling fluid to a drill string.

* * * * *